US011095388B2

(12) United States Patent
Inada

(10) Patent No.: US 11,095,388 B2
(45) Date of Patent: Aug. 17, 2021

(54) OPTICAL AMPLIFICATION DEVICE AND LIGHT AMPLIFICATION METHOD

(71) Applicant: NEC Corporation, Tokyo (JP)

(72) Inventor: Yoshihisa Inada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/649,486

(22) PCT Filed: Sep. 18, 2018

(86) PCT No.: PCT/JP2018/034387
§ 371 (c)(1),
(2) Date: Mar. 20, 2020

(87) PCT Pub. No.: WO2019/065354
PCT Pub. Date: Apr. 4, 2019

(65) Prior Publication Data
US 2020/0313790 A1 Oct. 1, 2020

(30) Foreign Application Priority Data

Sep. 29, 2017 (JP) .............................. JP2017-189425

(51) Int. Cl.
*H04J 14/02* (2006.01)
*H04B 10/2537* (2013.01)

(52) U.S. Cl.
CPC ...... *H04J 14/0221* (2013.01); *H04B 10/2537* (2013.01)

(58) Field of Classification Search
CPC .......................... H04J 14/0221; H04B 10/2537
(Continued)

(56) References Cited

U.S. PATENT DOCUMENTS 5,675,432 A 10/1997 Kosaka
6,310,716 B1 10/2001 Evans et al.
(Continued)

FOREIGN PATENT DOCUMENTS

CA 2550633 A1 12/2006
CN 1288172 A 3/2001
(Continued)

OTHER PUBLICATIONS

International Search report corresponding to PCT/JP2018/034387 dated Dec. 11, 2018 (2 pages).
(Continued)

*Primary Examiner* — Mohammad R Sedighian

(57) ABSTRACT

The de-multiplexing unit 2 de-multiplexes an inputted optical wavelength multiplexed signal into a first optical wavelength multiplexed signal having a first wavelength band and a second optical wavelength multiplexed signal having a second wavelength band in a longer wavelength band than the first wavelength band. The first optical amplifier 3 amplifies the first optical wavelength multiplexed signal. The second optical amplifier 4 amplifies the second optical wavelength multiplexed signal. The multiplexer 5 multiplexes the amplified first optical wavelength multiplexed signal and the amplified second optical wavelength multiplexed signal and outputs the multiplexed signal to a Raman amplifier 6. The first optical amplifier 3 adjusts the amplification rate of the first optical wavelength multiplexed signal so that the intensity of light in the second wavelength band is compensated for by the Raman effect in the Raman amplifier 6.

7 Claims, 14 Drawing Sheets

(58) Field of Classification Search
 USPC .......................................................... 398/79
 See application file for complete search history.

(56) References Cited

U.S. PATENT DOCUMENTS

| | | | |
|---|---|---|---|
| 6,396,623 | B1 | 5/2002 | Wysocki et al. |
| 6,456,426 | B1 | 9/2002 | Bolshtyansky et al. |
| 6,885,499 | B1 | 4/2005 | Hoshida et al. |
| 9,755,777 | B2 * | 9/2017 | Bato .................. H04Q 11/0005 |
| 2002/0024723 | A1 | 2/2002 | Sekiya et al. |
| 2002/0141008 | A1 | 10/2002 | Chbat et al. |
| 2002/0181045 | A1 | 12/2002 | Uda et al. |
| 2002/0181061 | A1 | 12/2002 | Uda et al. |
| 2003/0021010 | A1 * | 1/2003 | Motoshima .......... H04B 10/296 |
| | | | 359/337 |
| 2003/0117693 | A1 * | 6/2003 | Nakamura ......... H04B 10/2916 |
| | | | 359/334 |
| 2004/0004756 | A1 | 1/2004 | Hainberger et al. |
| 2006/0291037 | A1 | 12/2006 | Iannone et al. |
| 2016/0211643 | A1 | 7/2016 | Griseri et al. |

FOREIGN PATENT DOCUMENTS

| | | | |
|---|---|---|---|
| CN | 1427558 | A | 7/2003 |
| EP | 1076434 | A2 | 2/2001 |
| EP | 1175029 | A1 | 1/2002 |
| JP | H08-278523 | A | 10/1996 |
| JP | 2001-007768 | A | 1/2001 |
| JP | 2001-053686 | A | 2/2001 |
| JP | 2001-102666 | A | 4/2001 |
| JP | 2001-244528 | A | 9/2001 |
| JP | 2002-368691 | A | 12/2002 |
| JP | 2002-368692 | A | 12/2002 |
| JP | 2003-188831 | A | 7/2003 |
| JP | 2004-153477 | A | 5/2004 |
| JP | 2004-518333 | A | 6/2004 |
| JP | 2005-19501 | | 1/2005 |
| JP | 2007-006500 | A | 1/2007 |
| JP | 2015-119235 | A | 6/2015 |
| WO | 31/010063 | A1 | 2/2001 |
| WO | WO-2001/065740 | A1 | 9/2001 |
| WO | WO-2002/080408 | A1 | 10/2002 |
| WO | WO-2004/075363 | A1 | 9/2004 |

OTHER PUBLICATIONS

Written Opinion corresponding to PCT/JP2018/034387 dated Dec. 11, 2018 (4 pages).
European Extended European Search Report issued in European Patent Application No. 18861748.4, dated Oct. 6, 2020, 8 pages.
Chinese Office Action for CN Application No. 201880063589.6 dated Jan. 29, 2021 with English Translation.
Japanese Office Action for JP Application No. 2019-544979 dated May 11, 2021 with English Translation.

* cited by examiner

OPTICAL AMPLIFICATION DEVICE AND LIGHT AMPLIFICATION METHOD

CROSS REFERENCE TO RELATED APPLICATIONS

This application is a national stage application of International Application No. PCT/JP2018/034387 entitled "Optical Amplification Device and Light Amplification Method" filed on Sep. 18, 2018, which claims priority to Japanese Patent Application No. 2017-189425 filed on Sep. 29, 2017, the disclosures of which are hereby incorporated by reference in their entirety.

TECHNICAL FIELD

The present invention relates to an amplification technique for an optical wavelength multiplexed signal, and more particularly to a technique for suppressing wavelength deviation in a wideband optical wavelength multiplexed signal during amplification.

BACKGROUND ART

With an increase in traffic, development of a technique for increasing transmission capacity accommodated in one optical fiber has proceeded in an optical transmission system that transmits an optical wavelength multiplexed signal. In order to increase the transmission capacity accommodated in one optical fiber, in addition to a wideband in a typical C-band (1550 nm wavelength band), it is effective to configure the optical transmission system with a C+L-band where the wavelength band is expanded to a L-band (1580 nm wavelength band). Further, it is important to ensure good transmission quality even in a long-distance optical transmission system in a wideband such as the C+L-band.

In the wideband long-distance optical transmission system, an optical amplification device that ensures transmission quality of an optical signal has been developed as one of means for ensuring the transmission quality. For example, an optical amplification device as in PTL 1 is disclosed as an optical amplification that ensures the transmission quality of an optical signal.

PTL 1 relates to an optical amplification device that amplifies optical wavelength multiplexed signals in the wavelength bands of the C-band and the L-band and ensures the transmission quality of the optical signal. The optical amplification device in PTL 1 includes an optical amplifier that amplifies optical power of the optical wavelength multiplexed signals in the C-band and L-band and an optical amplifier that amplifies optical power of a separated optical wavelength multiplexed signal in the L-band, and multiplexes and outputs the optical wavelength multiplexed signals in the C-band and the L-band. In PTL 1, the optical wavelength multiplexed signal in the L-band is subjected to a Raman amplification on a transmission line on an input side to the optical amplification device by leaked light of excitation light from the optical amplifier that amplifies the optical power of the optical wavelength multiplexed signals in the C-band and the L-band.

PTL 2 also discloses an optical amplification device that amplifies optical signals in the wavelength bands of the C-band and the L-band. The optical amplification device in PTL 2 performs the Raman amplification by residual light of excitation light when the optical power is amplified by light from an excitation light source. Similarly, PTL 3 also describes that optical power is amplified by the Raman amplification.

CITATION LIST

Patent Literature

[PTL 1] Japanese Unexamined Patent Application Publication No. 2001-102666
[PTL 2] Japanese Unexamined Patent Application Publication No. 2005-19501
[PTL 3] Japanese Unexamined Patent Application Publication No. 2015-119235

SUMMARY OF INVENTION

Technical Problem

However, the technique in PTL 1 is not sufficient in terms of the following point. When loss of the optical power of the optical signal becomes large due to degradation of an optical fiber or the like and an amplification factor of the optical power in the optical amplifier becomes large, distortion of a spectrum of the optical wavelength multiplexed signal output from the optical amplifier becomes large. However, the optical amplification device in PTL 1 cannot compensate for level deviation in the optical wavelength multiplexed signal after amplification. Therefore, the optical amplification device in PTL 1 cannot sufficiently suppress, when the loss of the optical power is increasing, the level deviation of the optical power of the optical wavelength multiplexed signal to be output to the transmission line, and flatness of the optical wavelength multiplexed signal may not be ensured. Further, even in PTL 2, when loss of the optical power of the wideband optical wavelength multiplexed signal to be input to the optical amplification device is increasing, an increase in level deviation of the optical power during amplification cannot be sufficiently suppressed, and therefore flatness of the optical wavelength multiplexed signal may not be ensured.

In order to solve the above-described problem, an object of the present invention is to provide an optical amplification device capable of suppressing level deviation between wavelengths in a wideband optical wavelength multiplexed signal.

Solution to Problem

In order to solve the above-described problem, an optical amplification device according to the present invention includes a demultiplexing unit, a first optical amplifier, a second optical amplifier, and a multiplexing unit. The demultiplexing unit demultiplexes an optical wavelength multiplexed signal to be input into a first optical wavelength multiplexed signal having a first wavelength band and a second optical wavelength multiplexed signal having a second wavelength band located in a longer wavelength band than the first wavelength band. The first optical amplifier amplifies the first optical wavelength multiplexed signal. The second optical amplifier amplifies the second optical wavelength multiplexed signal. The multiplexing unit multiplexes the amplified first optical wavelength multiplexed signal and the amplified second optical wavelength multiplexed signal, and outputs the multiplexed optical wavelength multiplexed signal to a Raman amplification unit. The first optical amplifier adjusts an amplification factor of the first optical wavelength multiplexed signal in such a way that intensity of light in the second wavelength band is compensated for by a Raman effect in the Raman amplification unit.

An optical amplification method according to the present invention demultiplexes an optical wavelength multiplexed signal to be input into a first optical wavelength multiplexed signal having a first wavelength band and a second optical wavelength multiplexed signal having a second wavelength band located in a longer wavelength band than the first wavelength band. The optical amplification method according to the present invention adjusts an amplification factor of the first optical wavelength multiplexed signal in the first optical amplifier in such a way that intensity of light in the second wavelength band is compensated for by the Raman effect in the Raman amplification unit. The optical amplification method according to the present invention amplifies the first optical wavelength multiplexed signal in the first optical amplifier, by using the adjusted amplification factor. The optical amplification method according to the present invention amplifies the second optical wavelength multiplexed signal in the second optical amplifier. The optical amplification method according to the present invention multiplexes the amplified first optical wavelength multiplexed signal and the amplified second optical wavelength multiplexed signal, and outputs the multiplexed optical wavelength multiplexed signal to the Raman amplification unit.

Advantageous Effects of Invention

The present invention is able to suppress level deviation between wavelengths in the wideband optical wavelength multiplexed signal.

EXAMPLE EMBODIMENT

First Example Embodiment

Figure 1:
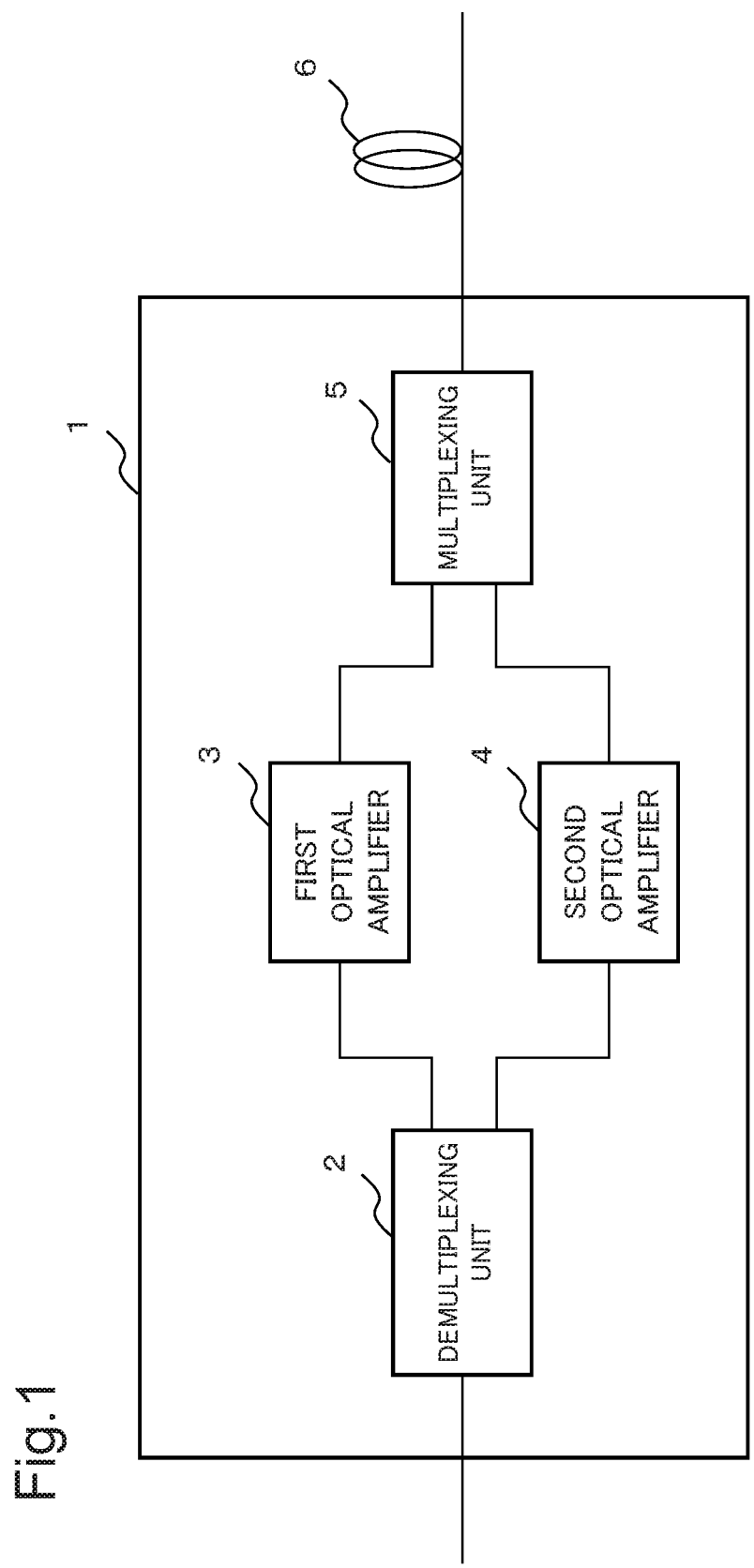
FIG. 1 is a diagram illustrating an overview of a configuration according to a first example embodiment of the present invention.

A first example embodiment of the present invention is described in detail with reference to the drawing. FIG. 1 illustrates an overview of a configuration of an optical amplification device 1 according to the present example embodiment. The optical amplification device 1 according to the present example embodiment includes a demultiplexing unit 2, a first optical amplifier 3, a second optical amplifier 4, and a multiplexing unit 5. The demultiplexing unit 2 demultiplexes an optical wavelength multiplexed signal to be input into a first optical wavelength multiplexed signal having a first wavelength band and a second optical wavelength multiplexed signal having a second wavelength band located in a longer wavelength band than the first wavelength band. The first optical amplifier 3 amplifies the first optical wavelength multiplexed signal. The second optical amplifier 4 amplifies the second optical wavelength multiplexed signal. The multiplexing unit 5 multiplexes the amplified first optical wavelength multiplexed signal and the amplified second optical wavelength multiplexed signal, and outputs the multiplexed optical wavelength multiplexed signal to a Raman amplification unit 6. The first optical amplifier 3 adjusts an amplification factor of the first optical wavelength multiplexed signal in such a way that intensity of light in the second wavelength band is compensated for by a Raman effect in the Raman amplification unit 6.

The optical amplification device 1 according to the present example embodiment amplifies the first optical wavelength multiplexed signal, in the first optical amplifier 3, in such a way that intensity of light in the second wavelength band is compensated for by the Raman effect in the Raman amplification unit 6, multiplexes the amplified first optical wavelength multiplexed signal and the second optical wavelength multiplexed signal, and outputs the multiplexed optical wavelength multiplexed signal to the Raman amplification unit 6. Therefore, in the Raman amplification unit 6, the second optical wavelength multiplexed signal is amplified with wavelength dependency in a direction in which a tilt of a spectrum is relaxed, based on a signal light of the first optical wavelength multiplexed signal. As a result, by using the optical amplification device 1 according to the present example embodiment, wavelength deviation in the wideband optical wavelength multiplexed signal can be suppressed.

Second Example Embodiment

Figure 2:
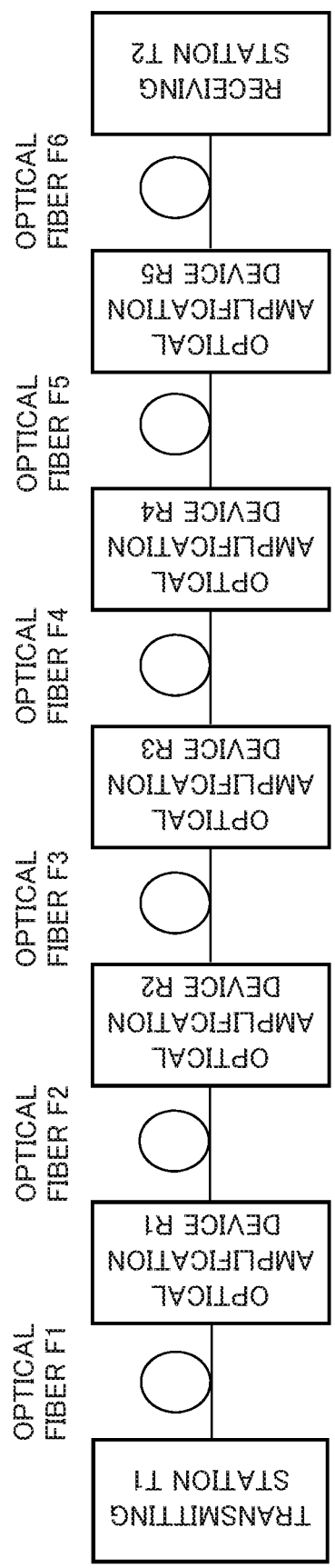
FIG. 2 is a diagram illustrating an overview of a configuration of an optical transmission system according to a second example embodiment of the present invention.

A second example embodiment of the present invention is described in detail with reference to the drawings. FIG. 2 illustrates an overview of a configuration of an optical transmission system according to the present example embodiment. The optical transmission system according to the present example embodiment includes a transmitting station T1, a receiving station T2, and a transmission line that connects the transmitting station T1 to the receiving station T2. The transmission line that connects the transmitting station T1 and the receiving station T2 is constituted of an optical fiber and an optical amplification device. As illustrated in FIG. 2, the optical transmission system according to the present example embodiment includes five optical amplification devices with an optical amplification device R1, an optical amplification device R2, an optical amplification device R3, an optical amplification device R4, and an optical amplification device R5. The devices are each connected by an optical fiber F1, an optical fiber F2, an optical fiber F3, an optical fiber F4, an optical fiber F5, and an optical fiber F6.

The optical transmission system according to the present example embodiment is an optical communication system in which the transmitting station T1 generates an optical wavelength multiplexed signal, based on optical signals input from each communication line, and the generated wavelength multiplexed signal is transmitted to the receiving station T2 via the transmission line constituted of the optical fibers and the optical amplification devices. The optical transmission system according to the present example embodiment transmits an optical wavelength multiplexed signal acquired by wavelength-multiplexing of optical signals in the wavelength bands of the C-band and the L-band from the transmitting station T1 to the receiving station T2. In the following description, an example in which an optical wavelength multiplexed signal is transmitted from the transmitting station T1 to the receiving station T2 is described, however, the optical transmission system according to the present example embodiment may be configured to perform bidirectional transmission and reception of the optical wavelength multiplexed signal.

Figure 3:
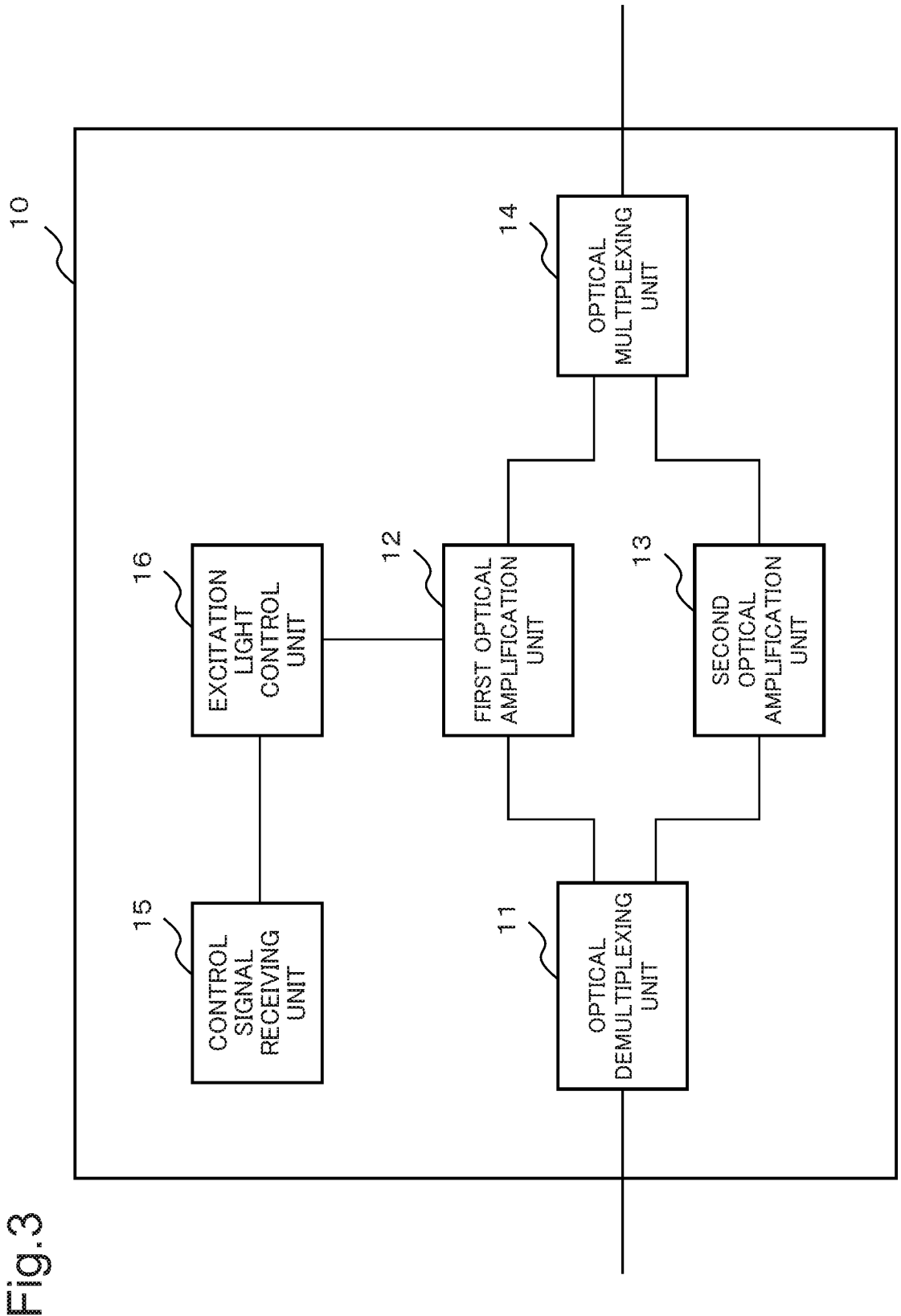
FIG. 3 is a block diagram illustrating a configuration of an optical amplification device according to the second example embodiment of the present invention.

A configuration of the optical amplification devices R1 to R5 is described. FIG. 3 illustrates, as an optical amplification device 10, the configuration of the optical amplification device to be used as the optical amplification devices R1 to R5 according to the present example embodiment.

The optical amplification device 10 according to the present example embodiment includes an optical demultiplexing unit 11, a first optical amplification unit 12, a second optical amplification unit 13, an optical multiplexing unit 14, a control signal receiving unit 15, and an excitation light control unit 16.

The optical demultiplexing unit 11 has a function of separating an optical wavelength multiplexed signal to be input from the optical fiber on the input side into optical wavelength multiplexed signals in the C-band and the L-band, and outputting the separated optical wavelength multiplexed signals. The optical wavelength multiplexed signal in the C-band is constituted of optical signals from 1530 to 1565 nm. The optical wavelength multiplexed signal in the L-band is constituted of optical signals from 1565 to 1625 nm. The optical demultiplexing unit 11 outputs the optical wavelength multiplexed signal in the C-band among the optical wavelength multiplexed signals to be input to the first optical amplification unit 12. Further, the optical demultiplexing unit 11 outputs the optical wavelength multiplexed signal in the L-band among the optical wavelength multiplexed signals to be input from the transmission line to the second optical amplification unit 13.

For example, a wavelength division multiplex (WDM) filter formed by a dielectric multilayer film can be used for the optical demultiplexing unit 11. With regard to the input optical wavelength multiplexed signals in the two wavelength bands, the WDM filter formed by the dielectric multilayer film transmits one wavelength band and reflects the other wavelength band, thereby separating the optical wavelength multiplexed signals into two wavelength bands. A spectroscopic element such as a diffraction grating may be used for the optical demultiplexing unit 11. The optical demultiplexing unit 11 according to the present example embodiment is equivalent to the demultiplexing unit 2 according to the first example embodiment.

The first optical amplification unit 12 and the second optical amplification unit 13 have a function of amplifying optical power of the input optical wavelength multiplexed signal. An Erbium doped fiber amplifier (EDFA) can be used for the first optical amplification unit 12 and the second optical amplification unit 13. The first optical amplification unit 12 according to the present example embodiment changes an amplification factor of the optical wavelength multiplexed signal in the C-band by adjusting optical power of an excitation light source, based on control by the excitation light control unit 16. The second optical amplification unit 13 amplifies the optical wavelength multiplexed signal in the L-band with a predetermined amplification factor, and outputs the amplified optical wavelength multiplexed signal. The first optical amplification unit 12 and the second optical amplification unit 13 according to the present example embodiment are equivalent to the first optical amplifier 3 and the second optical amplifier 4 according to the first example embodiment, respectively.

The optical multiplexing unit 14 has a function of multiplexing the input optical wavelength multiplexed signals and outputting the multiplexed optical wavelength multiplexed signal. For example, the WDM filter having the similar configuration to the optical demultiplexing unit 11 can be used for the optical multiplexing unit 14. A multiplexing element such as an optical coupler or a diffraction grating may be used for the optical multiplexing unit 14. The optical multiplexing unit 14 according to the present example embodiment is equivalent to the multiplexing unit 5 according to the first example embodiment.

The control signal receiving unit 15 has a function of receiving information on the amplification factor of the optical power of the optical wavelength multiplexed signal in the first optical amplification unit 12. The control signal receiving unit 15 receives the information on the amplification factor of the optical power of the first optical amplification unit 12 from the transmitting station T1, the receiving station T2, a communication management device, or the like via a communication line for control. The transmitting station T1, the receiving station T2, the communication management device, or the like monitors the transmission line, and transmits the information on the amplification factor in the first optical amplification unit 12 to the optical amplification device 10 in the subsequent stage of the optical fiber in which signal loss increases.

The excitation light control unit 16 controls the first optical amplification unit 12, based on the information on the amplification factor of the optical power of the first optical amplification unit 12 to be received via the control signal receiving unit 15. The excitation light control unit 16 controls the optical power of the excitation light in the first optical amplification unit 12, based on the information on the amplification factor of the optical power in the first optical amplification unit 12, and adjusts the amplification factor of the optical power in the first optical amplification unit 12. For example, a semiconductor device in which a circuit pattern of a control circuit is formed is used for the excitation light control unit 16.

Figure 4:
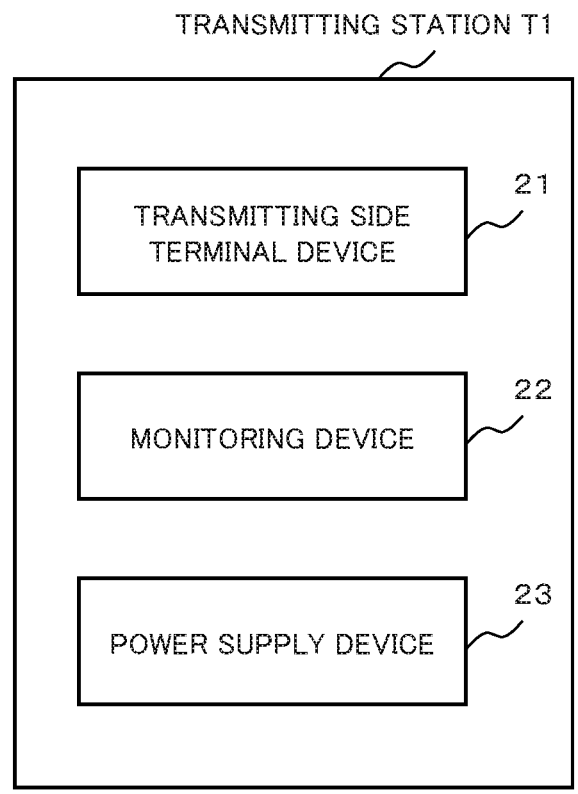
FIG. 4 is a block diagram illustrating a configuration of a transmitting station according to the second example embodiment of the present invention.

A configuration of the transmitting station T1 is described. FIG. 4 illustrates an overview of the configuration of the transmitting station T1 according to the present example embodiment. The transmitting station T1 according to the present example embodiment includes a transmitting side terminal device 21, a monitoring device 22, and a power supply device 23.

The transmitting side terminal device 21 generates an optical signal of each wavelength to be transmitted to the receiving station T2, based on a signal to be input from each communication line connected to the transmitting station T1. The transmitting side terminal device 21 generates an optical wavelength multiplexed signal by multiplexing the generated optical signals of each wavelength, and transmits the generated optical wavelength multiplexed signal to the optical fiber F1 constituting the transmission line connected to the receiving station T2.

The monitoring device 22 has a function of monitoring a state on the transmission line connected to the receiving station T2. The monitoring device 22 identifies, for example, by monitoring a DC resistance value of a feeder, a portion where an anomaly occurs in the optical fiber and signal loss becomes large. The monitoring device 22 acquires information on a spectral shape of a received signal and signal quality at the receiving station T2, and determines a degradation state of the optical fiber on the transmission line. When information on repair performed for the optical fiber is input or increasing signal loss is detected, the monitoring device 22 transmits a control signal for changing an optical amplification factor of the C-band to the optical amplification device in the subsequent stage of the optical fiber where an anomaly is detected.

The power supply device 23 supplies power to each optical amplification device via a feeder of the optical fiber.

Figure 5:
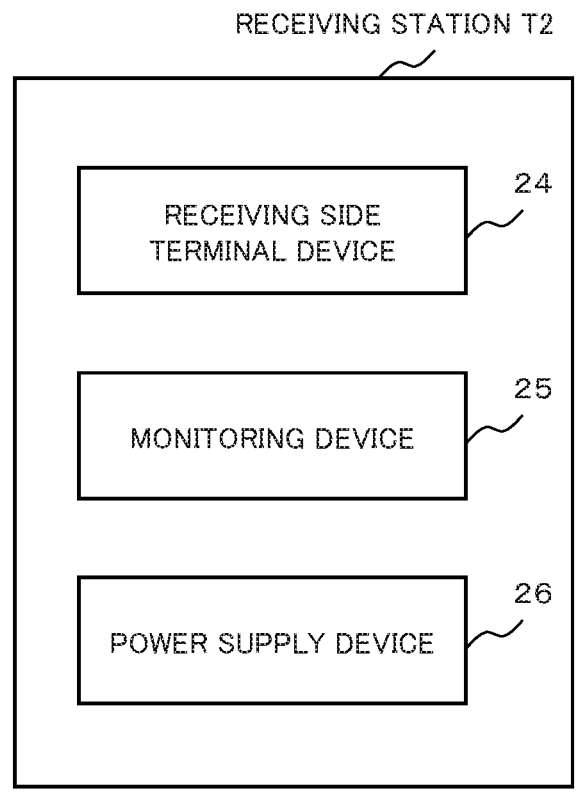
FIG. 5 is a block diagram illustrating a configuration of a receiving station according to the second example embodiment of the present invention.

A configuration of the receiving station T2 is described. FIG. 5 illustrates an overview of the configuration of the receiving station T2 according to the present example embodiment. The receiving station T2 according to the present example embodiment includes a receiving side terminal device 24, a monitoring device 25, and a power supply device 26.

The receiving side terminal device 24 performs decoding and the like of the optical wavelength multiplexed signal to be input from the optical fiber F6 constituting the transmission line, and generates a signal to be output to each communication line connected to the receiving station T2. The receiving side terminal device 24 transmits the generated signal to each communication line.

The monitoring device 25 has a function of monitoring presence or absence of a failure on the transmission line connected to the transmitting station T1 and degradation of the optical fiber. The monitoring device 25 monitors, for example, the spectral shape, a bit error ratio (BER), and the like of the optical wavelength multiplexed signal received at the receiving side terminal device 24, and determines, when quality of the received signal is worse than a reference, that a failure or degradation of the optical fiber has occurred.

The power supply device 26 applies voltage to the feeder of the optical fiber. The power supply device 23 and the power supply device 26 share the application of voltage to the feeder during power feeding. The power supply device 23 and the power supply device 26 share, for example, the voltage applied to the optical fiber by one half, and apply the voltage to the feeder. The power supply device 23 and the power supply device 26 may be designed in such a way that, when any power supply device fails, the other power supply device applies the full voltage.

The optical fibers F1 to F6 are constituted of an optical fiber for transmitting an optical signal and a feeder for supplying power to the optical amplification device and the like.

FIG. 2 illustrates a case where there are five optical amplification devices, however, the number of optical amplification devices may be other than five.

An operation of the optical transmission system according to the present example embodiment is described. An optical wavelength multiplexed signal is output from the transmitting station T1 to the transmission line, and is transmitted to receiving station T2 via the optical fiber and the optical amplification devices on the transmission line. The optical wavelength multiplexed signal is amplified in each optical amplification device when transmitted through the transmission line.

Figure 6:
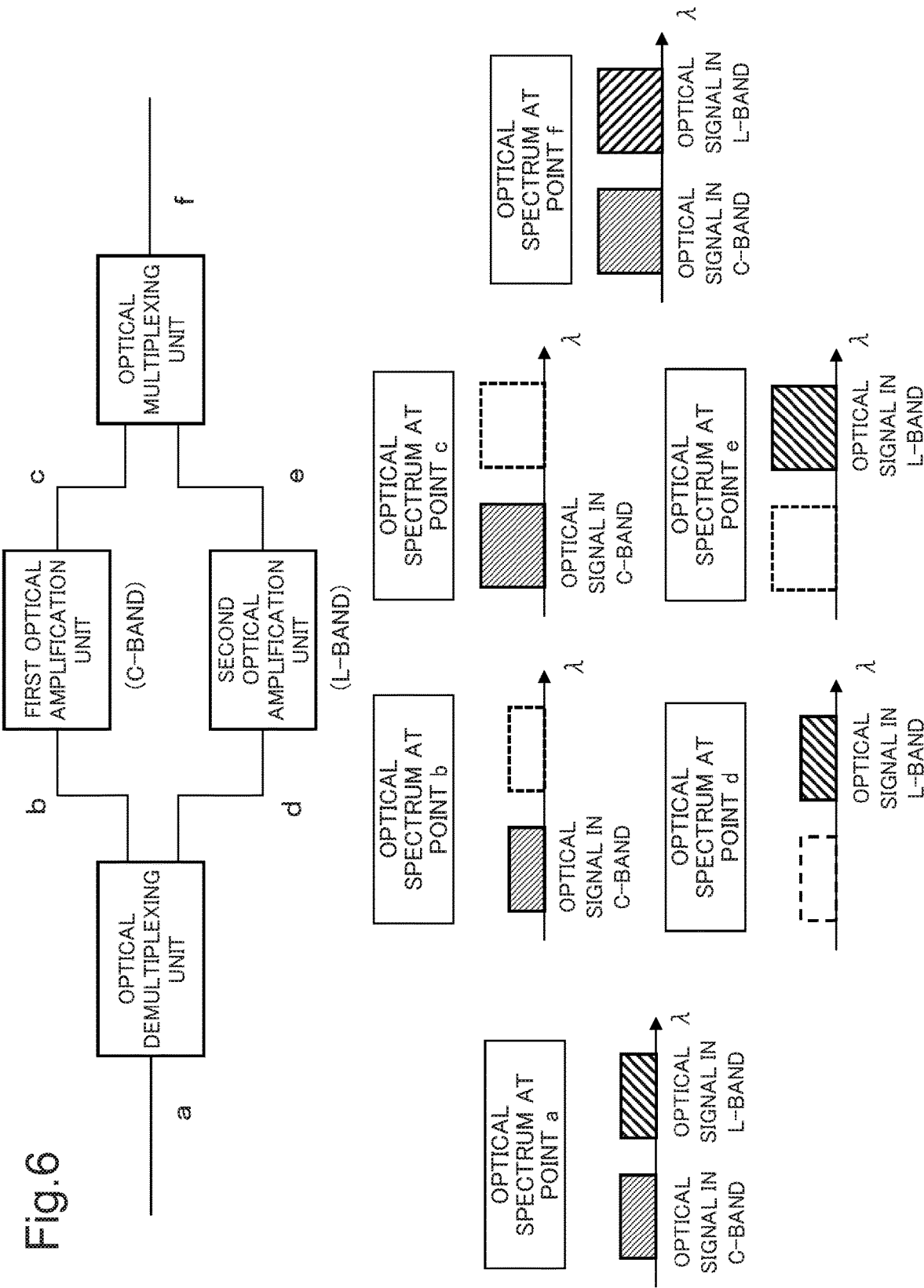
FIG. 6 is a diagram schematically illustrating a spectral shape in a normal condition at each point of the optical amplification device according to the second example embodiment of the present invention.

FIG. 6 schematically illustrates a state of an optical spectrum in each part of the optical amplification device in a normal condition, namely, in a state where the signal loss in the optical fiber constituting the transmission line is not increased. At a point a being an input portion of the optical amplification device, the optical signals in the C-band and the L-band are wavelength-multiplexed. In the normal condition, the optical signals in the C-band and the L-band are input with approximately equal optical power due to amplification in each optical amplification device on the transmission line. The optical signal in the C-band is separated and then amplified at the first optical amplifier 12, and thus the optical power at a point c is higher than the optical power at a point b. Similarly, the optical signal in the L-band is separated and then amplified at the second optical amplifier 13, and thus the optical power at a point e is higher than the optical power at a point d. The optical signals each amplified in the C-band and the L-band are multiplexed at the optical multiplexing unit 14 and are output to the transmission line. The optical wavelength multiplexed signal to be output to the optical fiber in the subsequent stage of the optical amplification device includes the optical signals in the C-band and the L-band with approximately equal optical power, as illustrated at a point f.

Figure 7:
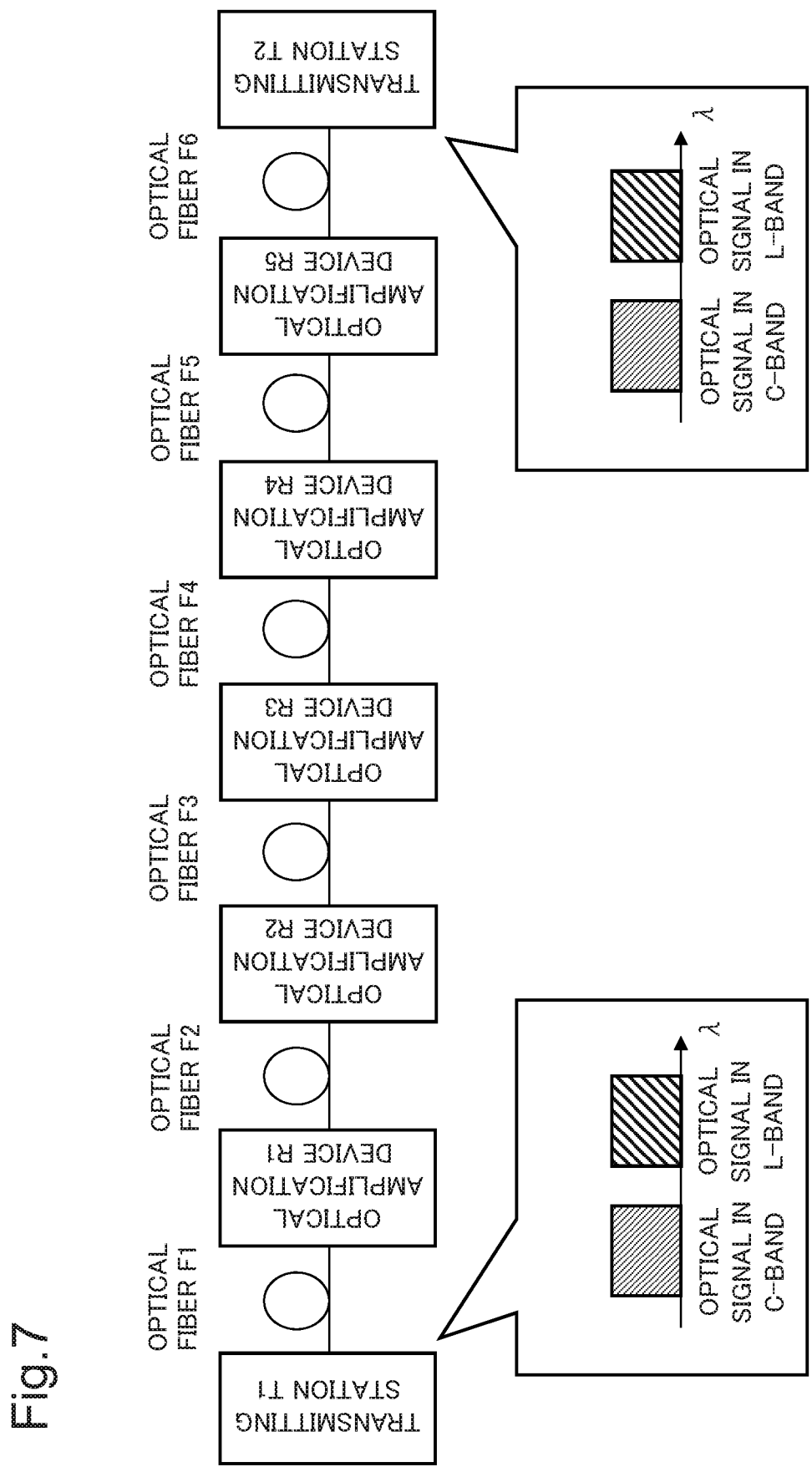
FIG. 7 is a diagram schematically illustrating a spectral shape of an optical signal in normal condition at the transmitting station and the receiving station of the optical transmission system according to the second example embodiment of the present invention.

FIG. 7 schematically illustrates the spectral shape of an output signal at the transmitting station T1 and the spectral shape of a received signal at the receiving station T2 in the normal condition. In the normal condition, the optical power is amplified in each optical amplification device on the transmission line, and thus the received signals in the C-band and the L-band have approximately equal optical power.

Next, an operation in a case of increasing signal loss due to damage or degradation of the optical fiber is described, using a case of increasing signal loss in the optical fiber F2 as an example.

Figure 8:
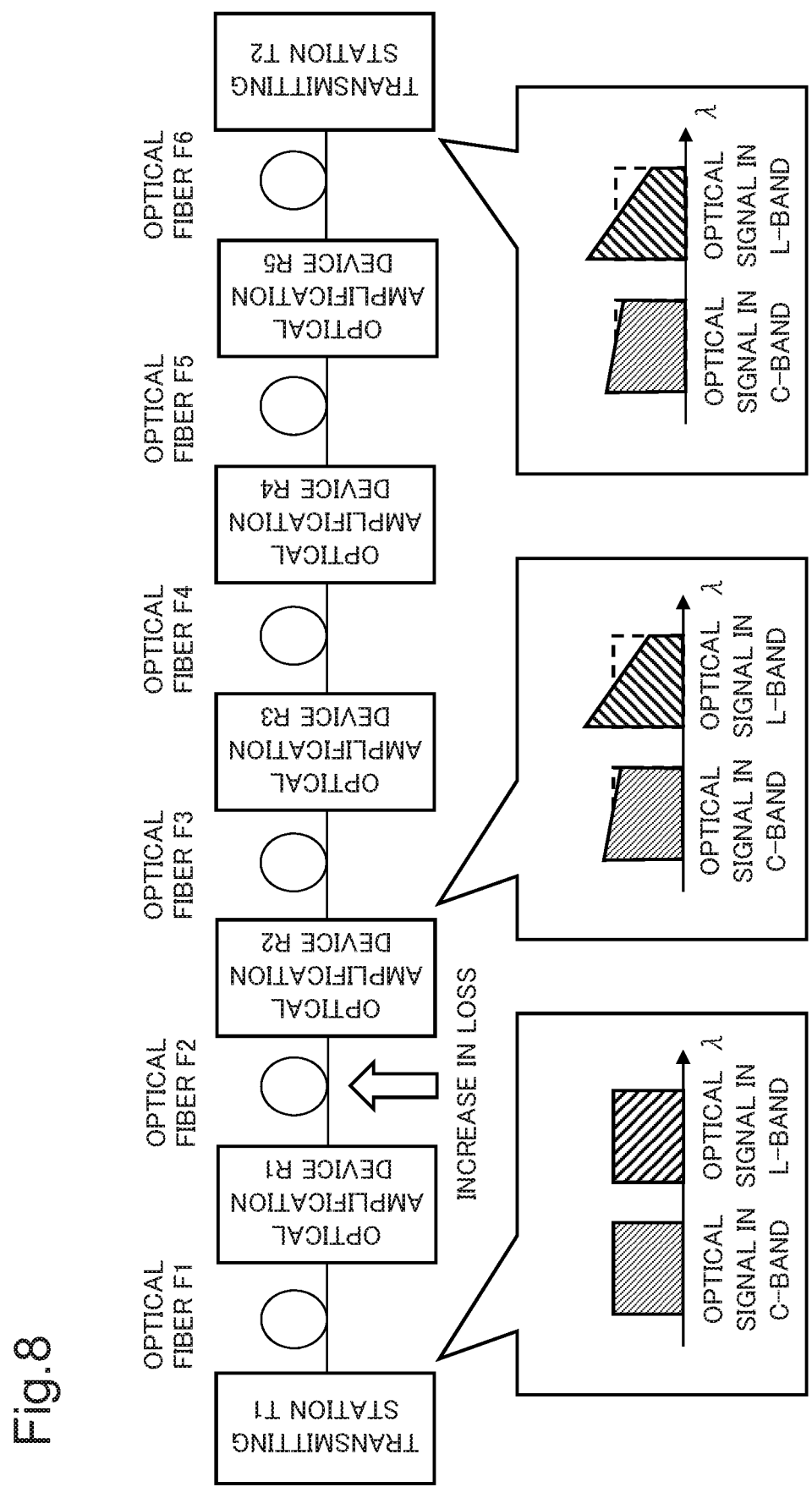
FIG. 8 is a diagram schematically illustrating the spectral shape at each point on a transmission line of the optical transmission system in a case of increasing loss.

FIG. 8 schematically illustrates the spectral shape at each point on the transmission line when the loss increases in the optical fiber F2. In FIG. 8, after the output from the transmitting station T1, the optical power of the optical signal in the C-band and the optical power of the optical signal in the L-band are approximately equal. Then, when the loss of the optical signals occurs during passing through the optical fiber F2 in which the loss is increasing, amplification gain acquired when the optical power is amplified in the optical amplification device R2 becomes large by a self-healing effect. Since a short wavelength side has a wavelength dependency in which the amplification gain becomes large, both the C-band and the L-band have the spectral shape in which the optical power on the short wavelength side is large and the optical power on the long wavelength side is small. Level deviation of the optical power between the wavelengths generated in the optical amplification device R2 remains even when the optical signals reach the receiving station T2. When the level deviation of the optical power between the wavelengths remains until reaching the receiving station T2, quality of the received signal on the short wavelength side is degraded by a nonlinear optical effect in the optical fiber. The quality of the received signal on the long wavelength side is degraded since a signal noise ratio (SNR) decreases.

The monitoring device 22 detects an increase in the signal loss in the optical fiber F2, based on information on which repair performed for the optical fiber F2, information on the reception quality, or the like, to be input by an operator, from a communication line, or the like. The monitoring device 22 transmits, when detecting the increase in the signal loss in the optical fiber F2, to the optical amplification device R2, a control signal for changing the amplification factor together with information on a set value of the amplification factor in the first optical amplification unit 12.

The control signal receiving unit 15 in the optical amplification device R2 transmits, when receiving the information on the set value of the amplification factor in the first optical amplification unit 12, the received information to the excitation light control unit 16. The excitation light control unit 16 controls, when receiving the information on the set value of the amplification factor in the first optical amplification unit 12, an excitation light source of the first optical amplification unit 12 in such a way as to become the received set value, and changes the amplification factor in first optical amplification unit 12.

The first optical amplification unit 12 amplifies, when the amplification factor in the first optical amplification unit 12 is changed based on the received information, the optical power in such a way as to become a newly set amplification factor, and outputs the optical signal.

Figure 9:
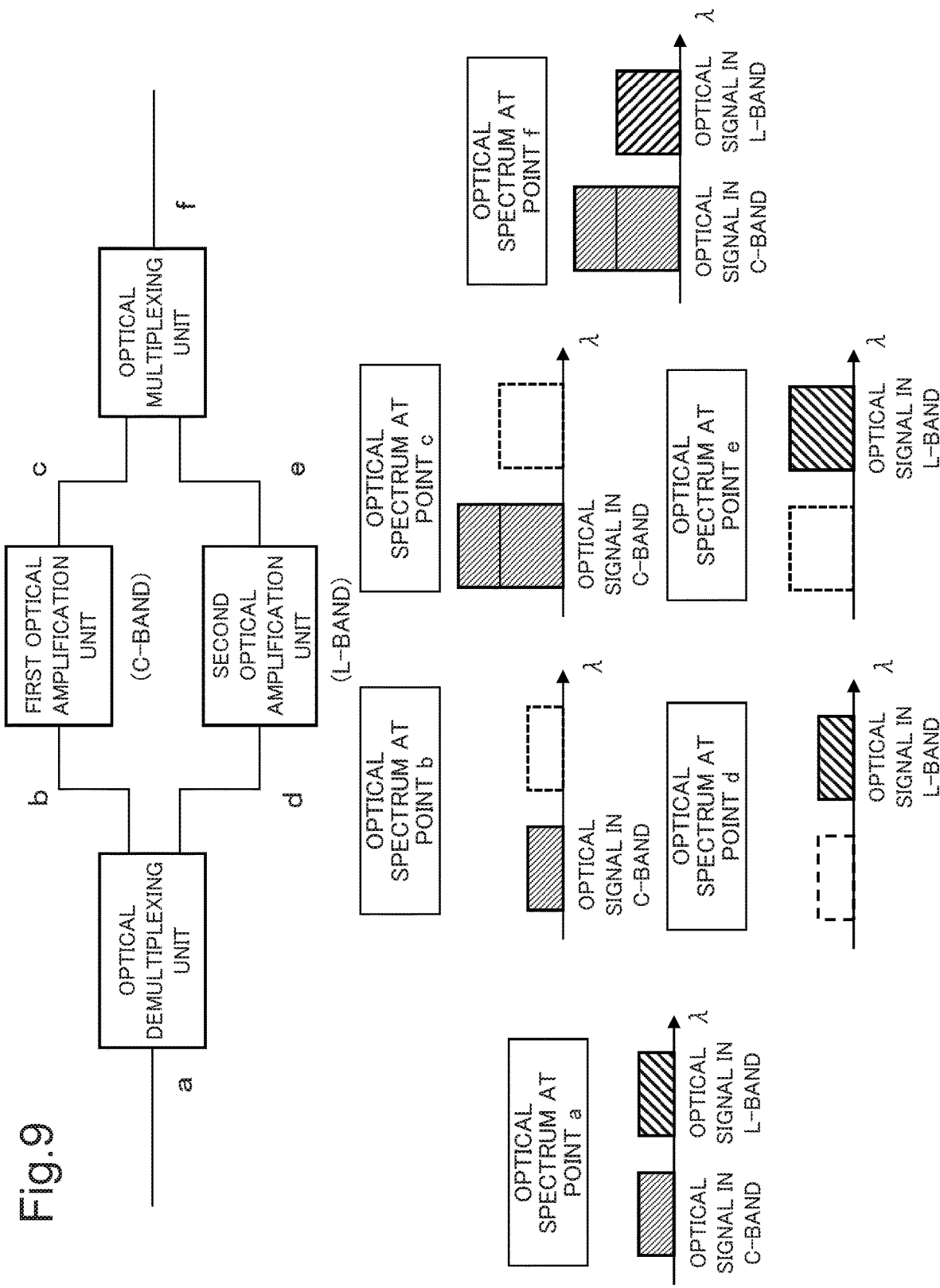
FIG. 9 is a diagram schematically illustrating the spectral shape at each point of the optical amplification device in a case of increasing an amplification factor of an optical wavelength multiplexed signal in the C-band according to the second example embodiment of the present invention.

FIG. 9 schematically illustrates a state of the optical spectrum in each part of the optical amplification device when the amplification factor in the first optical amplification unit 12 is reset. The optical signal in the C-band has a larger amplification factor, and thus the optical power in the C-band at the point c is larger than the optical power in the L-band at the point e. Therefore, at a point f after multiplexing in the optical multiplexing unit 14, the optical wavelength multiplexed signal is output to the optical fiber F3 in a state where the optical power in the C-band is larger than the optical power in the L-band.

When the optical power to be output from the first optical amplification unit 12 on the C-band side is increased, transition of the optical power from the short wavelength to the long wavelength occurs in the optical fiber F3 by the Raman effect being one of nonlinear optical effects of the optical fiber. When the transition of the optical power occurs, it is possible to induce a tilt in a direction in which the optical power rises from the short wavelength toward the long wavelength side.

Figure 10:
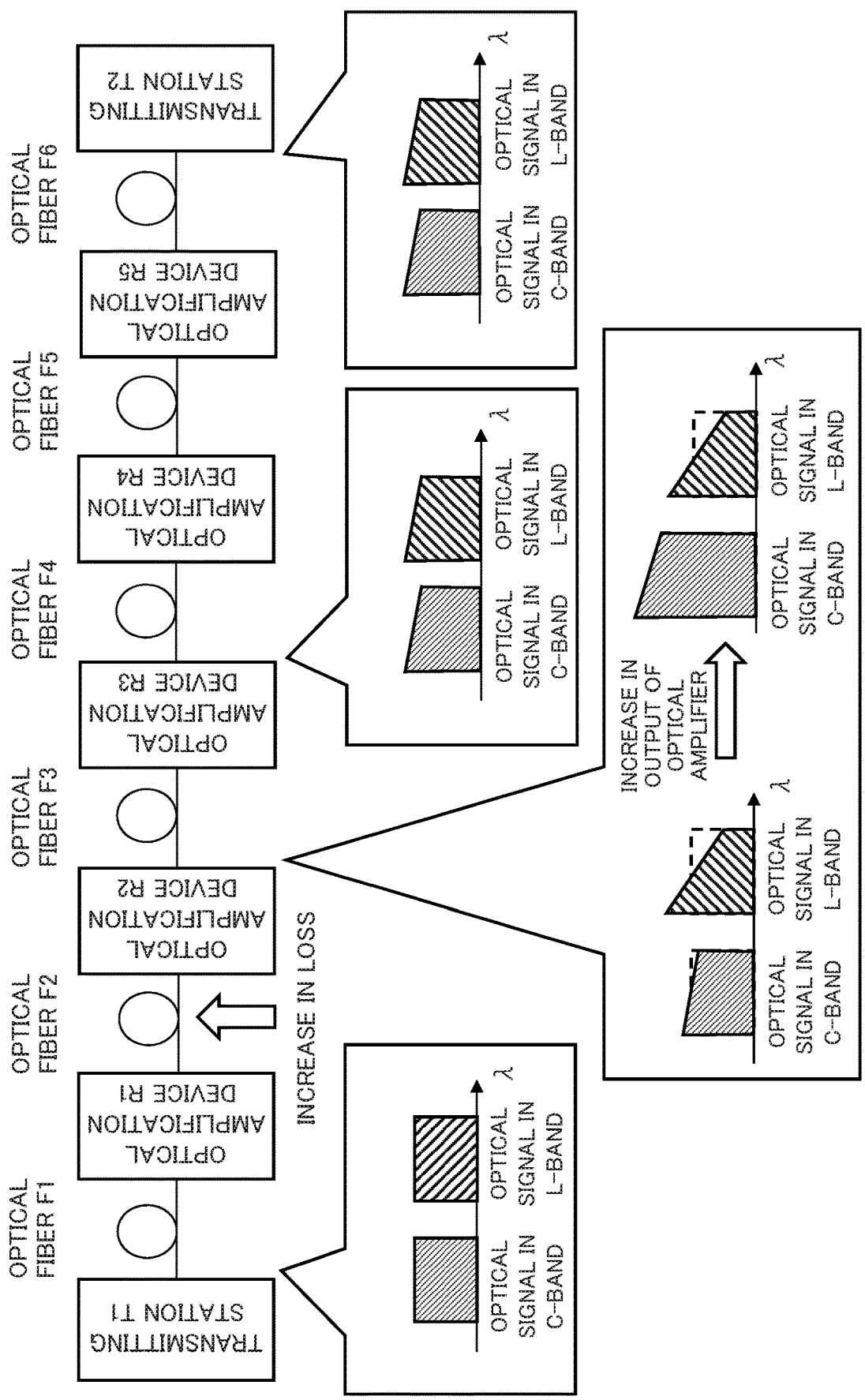
FIG. 10 is a diagram schematically illustrating the spectral shape at each point on the transmission line of the optical transmission system in the case of increasing the amplification factor of the optical wavelength multiplexed signal in the C-band according to the second example embodiment of the present invention.

FIG. 10 schematically illustrates the spectral shape at each point on the transmission line when the Raman amplification of the optical signal in the L-band is performed, based on the optical signal in the C-band. When the tilt in the direction in which the optical power rises from the short wavelength toward the long wavelength side occurs, an optical spectral tilt in which the short wavelength caused by the increase in the loss in the optical fiber F2 rises and the optical spectral tilt in which the long wavelength by the Raman effect occurred in the optical fiber F3 rises are mutually canceled. For this reason, the level deviation of the optical power between the wavelengths in the optical wavelength multiplexed signal after transmission can be improved. When the level deviation of the optical power is improved in the optical amplification device R2, the optical fiber in the subsequent stage operates normally and therefore transmission quality of the optical signal in the receiving station T2 is improved.

Figure 11:
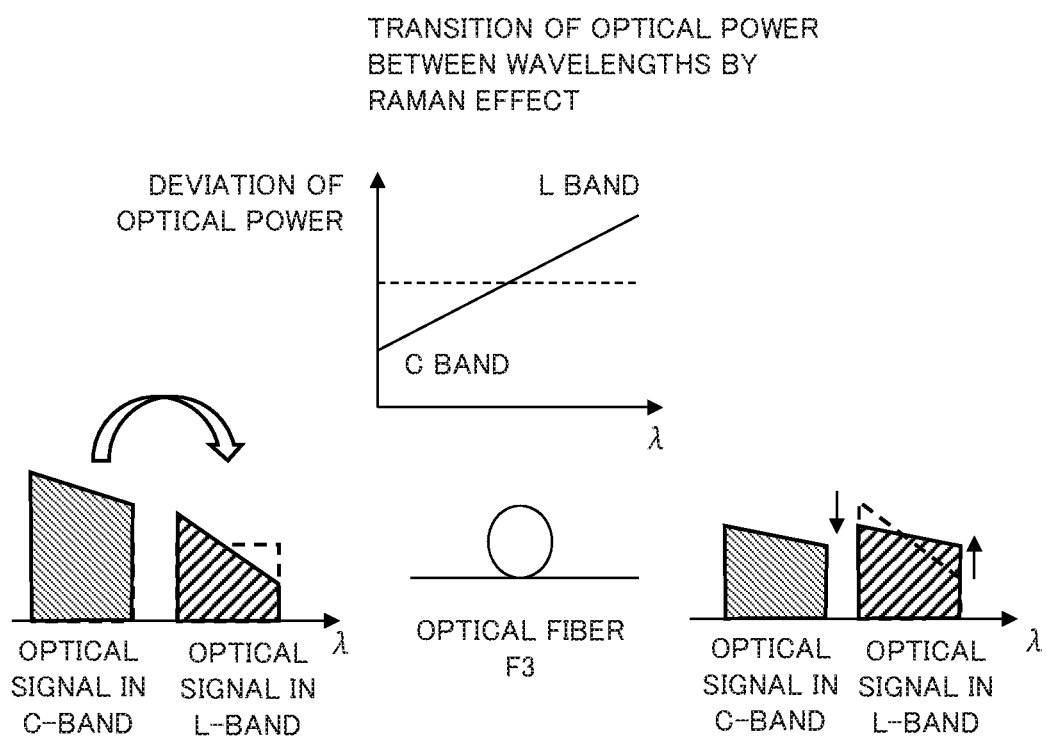
FIG. 11 is a diagram schematically illustrating an example of transition of optical power between wavelengths by a Raman effect.

FIG. 11 schematically illustrates a change in the spectral shape when the transition of the optical power occurs between the wavelengths by the Raman effect. As illustrated in FIG. 11, when the optical wavelength multiplexed signal passes through the optical fiber, the transition of the optical power occurs from the C-band to the L-band by the Raman effect. In the L-band, the optical power on the short wavelength side decreases and the optical power on the long wavelength side increases. Therefore, the level deviation of the optical signal in the L-band, namely, the tilt of the optical power is relaxed, and a difference between the optical power in the C-band and the optical power in the L-band is also reduced.

The optical transmission system of the present invention increases, when the signal loss of the optical fiber constituting the transmission line increases, the amplification factor of the optical wavelength multiplexed signal in the C-band in the optical amplification device, multiplexes the optical wavelength multiplexed signal in the C-band with the optical wavelength multiplexed signal in the L-band, and transmits the multiplexed optical wavelength multiplexed signal to the optical fiber on the output side. In the optical fiber on the output side, the Raman effect causes the Raman amplification in which the transition of the optical power of the wavelength band in the C-band to the wavelength band in the L-band occurs, the optical power of the optical wavelength multiplexed signal in the C-band decreases, and the optical power of the optical wavelength multiplexed signal in the L-band increases. When the Raman amplification is performed, the amplification factor of the optical signal of the long wavelength is higher in the optical wavelength multiplexed signal of the L-band. Therefore, the difference between the optical power of the optical wavelength multiplexed signals in the C-band and the L-band and the level deviation of the optical power of the optical signal in the L-band are suppressed by the Raman amplification. As a result, the optical transmission system according to the present example embodiment can suppress, when the loss of the input signal light is increasing, the level deviation between the wavelengths in the wideband optical wavelength multiplexed signal.

Third Example Embodiment

Figure 12:
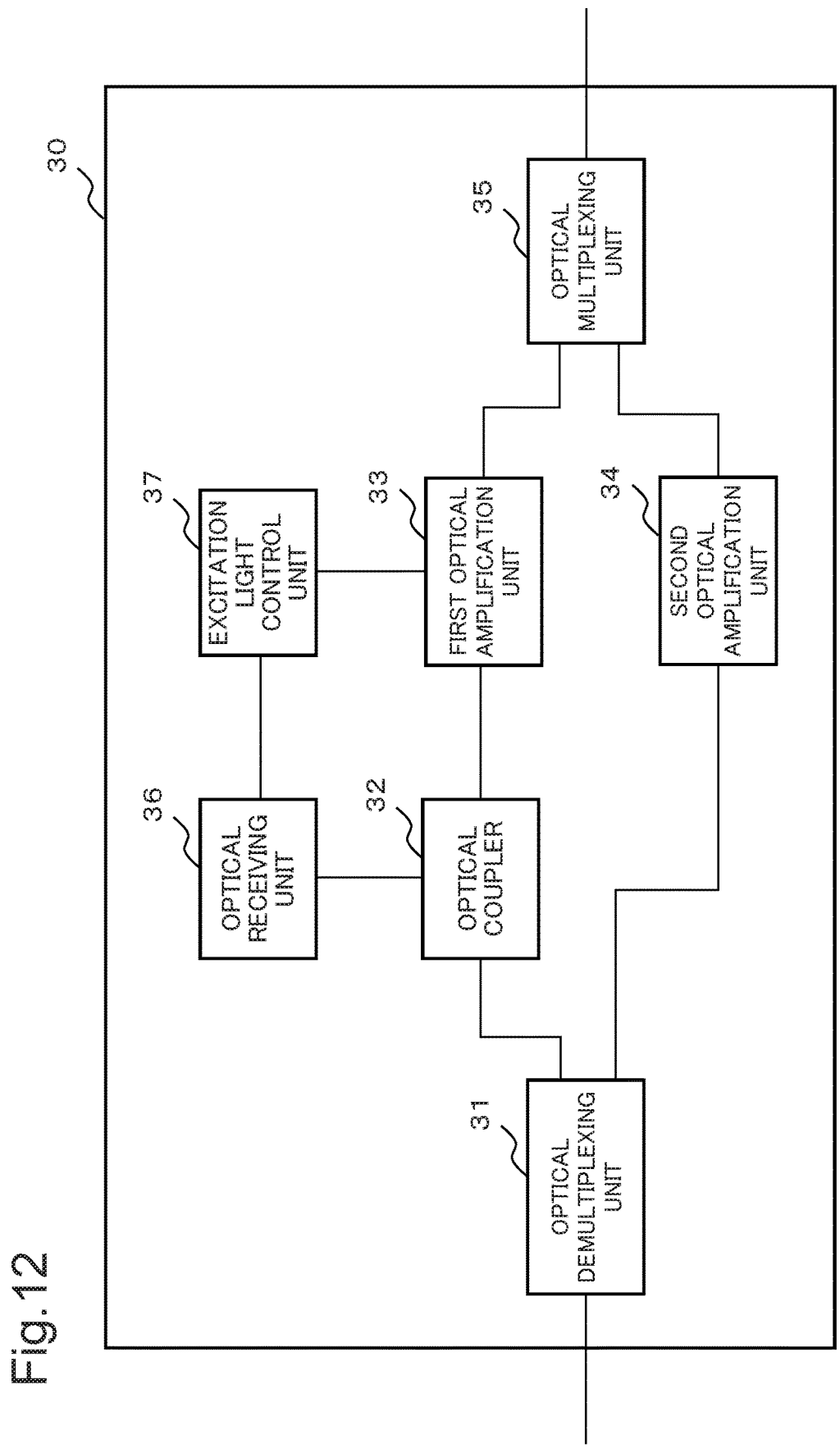
FIG. 12 is a block diagram illustrating a configuration of an optical amplification device according to a third example embodiment of the present invention.

A third example embodiment of the present invention is described in detail with reference to the drawing. FIG. 12 is a block diagram illustrating an overview of a configuration of an optical amplification device 30 according to the present example embodiment. In an optical transmission system similar to the second example embodiment illustrated in FIG. 2, the optical amplification device 30 according to the present example embodiment is used as an optical amplification device.

The optical amplification device 10 according to the second example embodiment receives a control signal indicating an amplification factor of the first optical amplification unit 12 via a communication line or the like for communication management. Instead of such a configuration, the optical amplification device 30 according to the present example embodiment acquires information on an amplification factor of a first optical amplification unit by detecting a control signal to be transmitted as an optical signal together with a wavelength multiplexed signal.

The optical amplification device 30 according to the present example embodiment includes an optical demultiplexing unit 31, an optical coupler 32, a first optical amplification unit 33, a second optical amplification unit 34, an optical multiplexing unit 35, an optical receiving unit 36, and an excitation light control unit 37.

The configurations and functions of the optical demultiplexing unit 31, the first optical amplification unit 33, the second optical amplification unit 34, and the optical multiplexing unit 35 according to the present example embodiment are similar to the units with the same name according to the second example embodiment. An optical wavelength multiplexed signal in the C-band being demultiplexed in the optical demultiplexing unit 31 according to the present example embodiment is input to the first optical amplification unit 33 via the optical coupler 32.

The optical coupler 32 demultiplexes the optical wavelength multiplexed signal in the C-band to be input from the optical demultiplexing unit 31, and outputs the demultiplexed optical signals to each of the optical receiving unit 36 and the first optical amplification unit 33.

The optical receiving unit 36 detects a control signal from the optical signal to be input and outputs the detected control signal to the excitation light control unit 37. The control signal is, for example, assigned to a wavelength that is not used for data transmission in the optical wavelength multiplexed signal in the C-band. The control signal may be superimposed on the optical signal of the wavelength band used for communication of a main signal as a low-frequency signal that does not affect the transmission of the main signal.

The excitation light control unit 37 controls the first optical amplification unit 33, based on information on an amplification factor of optical power of the first optical amplification unit 33 included in the control signal to be input from the optical receiving unit 36. The excitation light control unit 37 controls the optical power of an excitation light of the first optical amplification unit 33, based on the information on the amplification factor of the optical power of the first optical amplification unit 33, and changes the amplification factor of the optical power of the first optical amplification unit 33.

In a normal condition, the optical amplification device according to the present example embodiment amplifies, similarly to the optical amplification device according to the second example embodiment, each of the optical power of the optical wavelength multiplexed signals in the C-band and the L-band, based on a predetermined set value, and outputs the amplified optical wavelength multiplexed signals.

When loss of a signal to be transmitted through an optical fiber increases, the control signal indicating the information of the amplification factor of the first optical amplification unit 33 is transmitted from a transmitting station T1 to the optical amplification device together with the wavelength multiplexed signal in the C-band.

When the excitation light control unit 37 receives the control signal indicating the information on the amplification factor of the first optical amplification unit 33 via the optical receiving unit 36, the excitation light control unit 37 controls an excitation light source of the first optical amplification unit 33, based on the set value included in the control signal, and changes the amplification factor to the optical amplification factor specified by the control signal.

When the first optical amplification unit 33 starts amplification with the amplification factor indicated in the control signal, transition of the optical power by the Raman effect occurs in the optical fiber in the subsequent stage. When the transition of the optical power by the Raman effect occurs, level deviation of the optical power between the wavelengths in the C-band and the L-band is relaxed, and signal quality of the optical wavelength multiplexed signal to be transmitted to a receiving station T2 is maintained similarly to the second example embodiment.

The similar effect to the second example embodiment can be acquired by using the optical amplification device 30 according to the present example embodiment. The optical amplification device 30 according to the present example embodiment controls the amplification factor of the first optical amplification unit 33, based on the control signal to be transmitted together with the wavelength multiplexed signal in the C-band, and thus a communication line or the like for communication management is not required. Therefore, even in an environment where it is difficult to install a communication line in addition to an optical fiber for data transmission such as a submarine cable system, when loss of signal light to be input is increasing, wavelength deviation in a wideband optical wavelength multiplexed signal can be suppressed.

Fourth Example Embodiment

Figure 13:
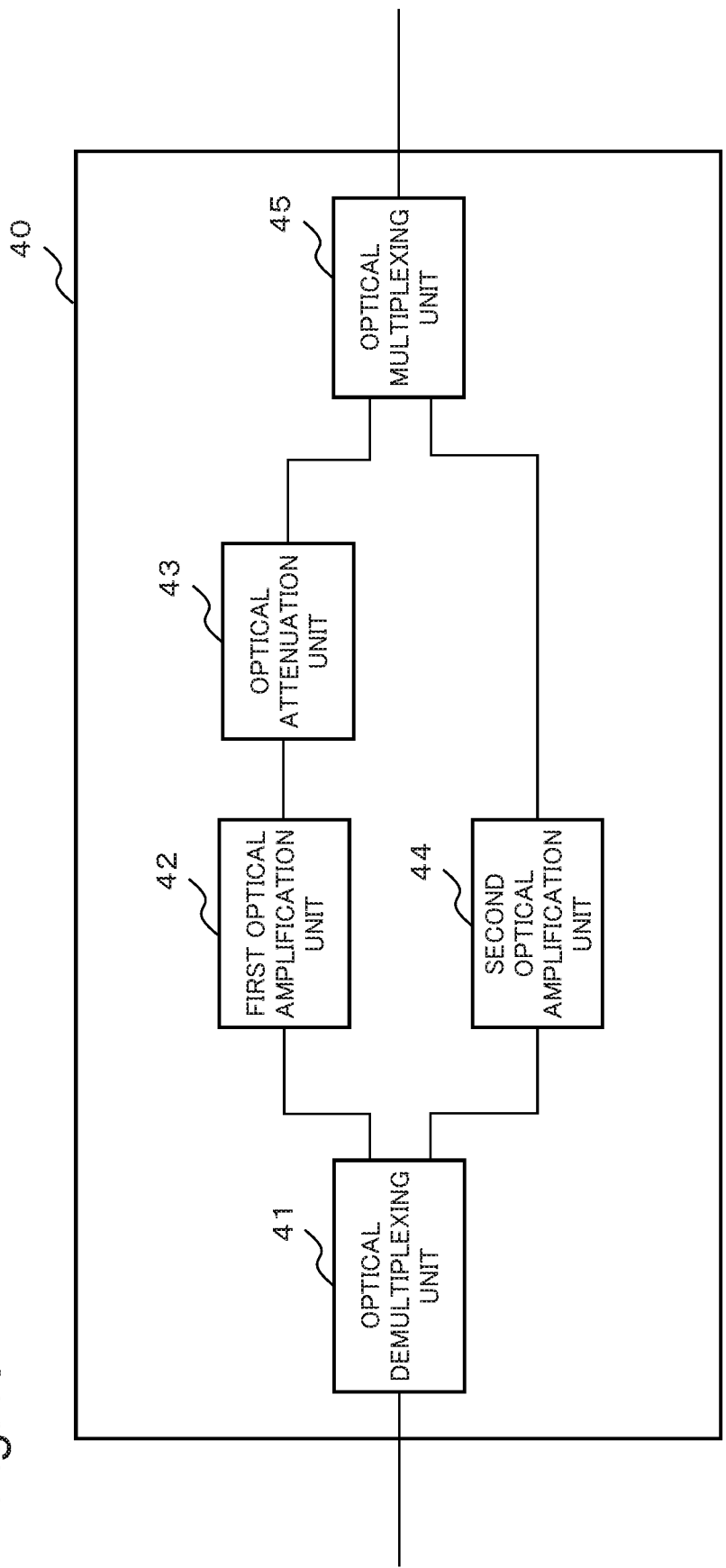
FIG. 13 is a block diagram illustrating a configuration of an optical amplification device according to a fourth example embodiment of the present invention.

A fourth example embodiment of the present invention is described in detail with reference to the drawing. FIG. 13 is a block diagram illustrating an overview of a configuration of an optical amplification device 40 according to the present example embodiment. In an optical transmission system similar to the second example embodiment illustrated in FIG. 2, the optical amplification device 40 according to the present example embodiment is used as an optical amplification device.

The optical amplification device 10 according to the second example embodiment adjusts the optical power of the optical wavelength multiplexed signal to be output with the amplification factor of the first optical amplification unit 12. Instead of such a configuration, the optical amplification device 40 according to the present example embodiment adjusts optical power of an optical wavelength multiplexed signal in the C-band by attenuation in an optical attenuation unit in the subsequent stage of a first optical amplification unit.

The optical amplification device 40 according to the present example embodiment includes an optical demultiplexing unit 41, a first optical amplification unit 42, an optical attenuation unit 43, a second optical amplification unit 44, and an optical multiplexing unit 45.

The configurations and functions of the optical demultiplexing unit 41, the second optical amplification unit 44, and the optical multiplexing unit 45 according to the present example embodiment are similar to the units with the same name according to the second example embodiment, respectively. The optical multiplexing unit 45 multiplexes the optical wavelength multiplexed signal in the C-band to be input from the optical attenuation unit 43 and an optical signal to be input from the second optical amplification unit 44, and outputs the multiplexed optical signal to a transmission line.

The first optical amplification unit 42 amplifies the input optical wavelength multiplexed signal in the C-band and outputs the amplified optical wavelength multiplexed signal. The first optical amplification unit 42 has the similar configuration to the first optical amplification unit 12 according to the second example embodiment, however amplification of optical power is performed based on a predetermined amplification factor. Specifically, when loss of the optical signal in the transmission line increases, the amplification factor of the optical power in the first optical amplification unit 42 is not changed.

The optical attenuation unit 43 has a function of attenuating an input optical signal of each wavelength. The optical attenuation unit 43 is an optical attenuator that can adjust an attenuation amount for each wavelength. An optical attenuator using a liquid crystal on silicon (LCOS) is used for the optical attenuation unit 43, for example. The optical attenuator using LCOS demultiplexes the input optical wavelength multiplexed signal into each wavelength, attenuates the optical power for each wavelength by controlling transmittance of a liquid crystal element, and then multiplexes the optical signals of each wavelength and outputs the multiplexed optical signal.

In a normal condition, the optical attenuation unit 43 performs attenuation in such a way that the optical power and a spectral shape of the C-band and the optical power and a spectral shape of the L-band become approximately equal. The optical attenuation unit 43 also attenuates, when signal loss increases, the optical signal in the C-band in such a way as to be the optical power and the spectral shape that cause correction of the spectral shape in the L-band by the Raman effect. The optical attenuation unit 43 increases, when the signal loss increases, the optical power of the optical wavelength multiplexed signal to be output by reducing the attenuation amount. In the optical amplification device 40 according to the present example embodiment, information on the attenuation amount of each wavelength when the signal loss increases is input to the optical attenuation unit 43 by an operator or the like.

An operation of the optical amplification device 40 according to the present example embodiment is described. The optical amplification device 40 according to the present example embodiment performs, in the normal condition, amplification and attenuation in such a way as to be a set amplification factor and a set attenuation amount, and outputs the optical wavelength multiplexed signals in the C-band and the L-band having approximately equal optical power and the spectral shapes without a tilt.

When a setting of the attenuation amount of the optical attenuation unit 43 is changed in a case of increasing the signal loss, the optical attenuation unit 43 attenuates the optical signal with the attenuation amount after the change and outputs the attenuated optical signal. At this time, the optical attenuation unit 43 reduces the attenuation amount and causes the optical power to be output to be larger than the optical power to be output in the normal condition. When the output power on the C-band side increases, transition of the optical power from a short wavelength to a long wavelength occurs by the Raman effect in an optical fiber in the subsequent stage. When the transition of the optical power by the Raman effect occurs, level deviation of the optical power between the C-band and the L-band is relaxed, and signal quality of the optical wavelength multiplexed signal to be transmitted to a receiving station T2 is maintained.

The similar effect to the second example embodiment can be acquired by using the optical amplification device 40 according to the present example embodiment. The optical amplification device 40 according to the present example embodiment performs attenuation for each wavelength in the optical attenuation unit 43 after the amplification by the first optical amplification unit 42, and thus the optical power and the spectral shape of the optical wavelength multiplexed signal in the C-band can be controlled more finely. As a result, by using the optical amplification device 40 according to the present example embodiment, it is possible to attenuate the optical wavelength multiplexed signal in the C-band according to a characteristic of the wavelength multiplexed signal in the L-band, and therefore the spectral shape of the optical wavelength multiplexed signal in the L-band can be further improved.

Fifth Example Embodiment

Figure 14:
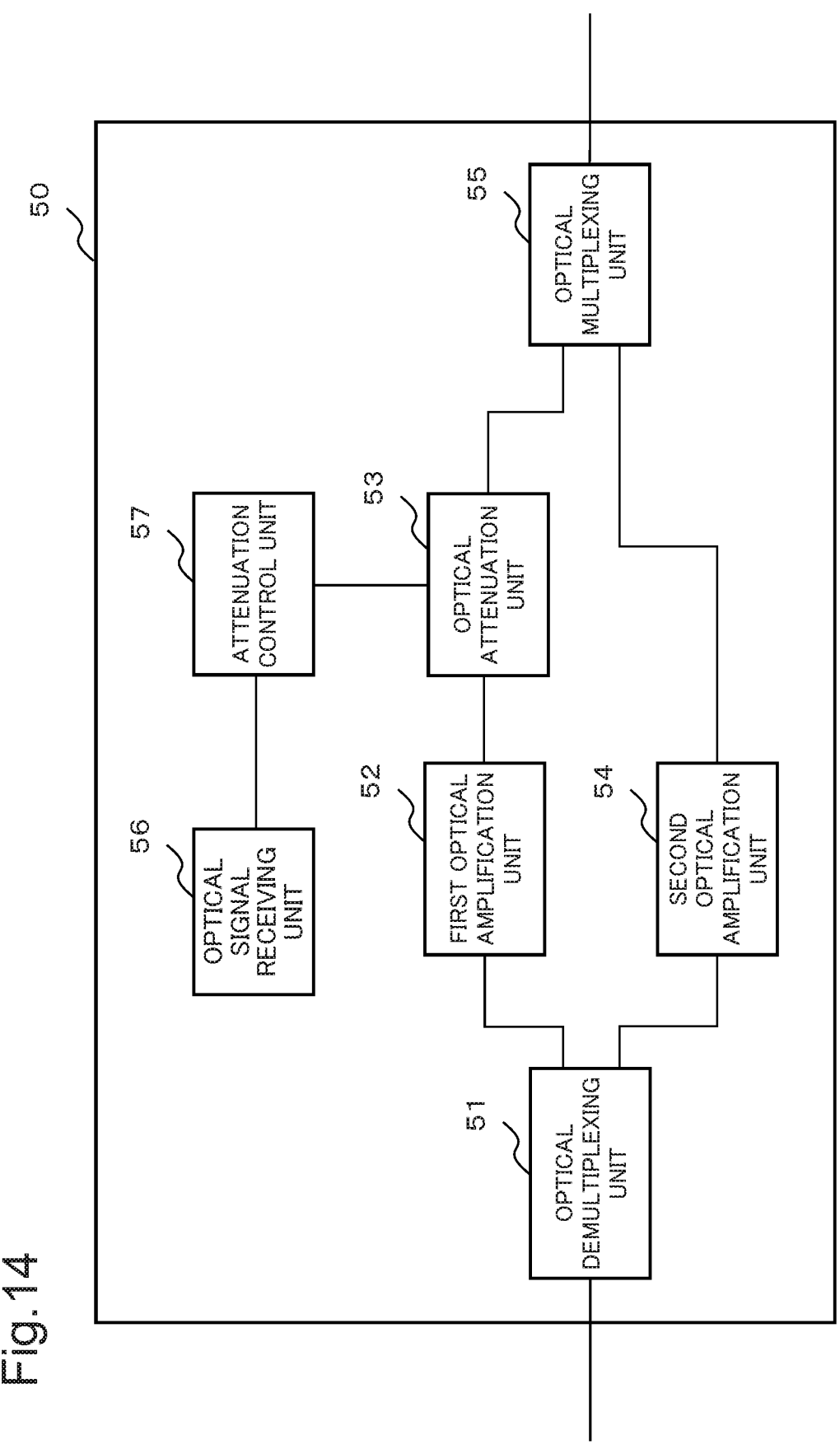
FIG. 14 is a block diagram illustrating a configuration of an optical amplification device according to a fifth example embodiment of the present invention.

A fifth example embodiment of the present invention is described in detail with reference to the drawing. FIG. 14 is a block diagram illustrating a configuration of an optical amplification device 50 according to the present example embodiment. In an optical transmission system similar to the second example embodiment illustrated in FIG. 2, the optical amplification device 50 according to the present example embodiment is used as an optical amplification device.

The optical amplification device 40 according to the fourth example embodiment needs to set the attenuation amount in the optical attenuation unit 43 by an operator or the like. The optical amplification device 50 according to the present example embodiment acquires information on an attenuation amount in an optical attenuation unit via a communication line or the like for control.

The optical amplification device 50 according to the present example embodiment includes an optical demultiplexing unit 51, a first optical amplification unit 52, an optical attenuation unit 53, a second optical amplification unit 54, an optical multiplexing unit 55, a control signal receiving unit 56, and an attenuation control unit 57.

The configurations and functions of the optical demultiplexing unit 51, the first optical amplification unit 52, the optical attenuation unit 53, the second optical amplification unit 54, and the optical multiplexing unit 55 according to the present example embodiment are similar to the units with the same name according to the fourth example embodiment.

The optical attenuation unit 53 attenuates an optical signal of each wavelength, based on a set value of an attenuation amount to be input from the attenuation control unit 57, and outputs the attenuated optical signal. An optical attenuator having a similar configuration to the optical attenuation unit 43 according to the fourth example embodiment can be used for the optical attenuation unit 53.

The control signal receiving unit 56 has a function of receiving information on the attenuation amount of the optical attenuation unit 53. The control signal receiving unit 56 receives the information on the attenuation amount of the optical attenuation unit 53 from a transmitting station T1, a receiving station T2, a communication management device, or the like, via a communication line for communication management. The transmitting station T1, the receiving station T2, the communication management device, or the like monitors a received signal and transmits, when signal loss increases, the attenuation amount of the optical attenuation unit 53 to the optical amplification device.

The attenuation control unit 57 controls the optical attenuation unit 53, based on the information on the attenuation amount of the optical attenuation unit 53 to be received via the control signal receiving unit 56. The attenuation control unit 57 controls the attenuation amount of the optical attenuation unit 53, based on the information on an amplification factor of the attenuation amount of the optical attenuation unit 53, and adjusts optical power of an output signal.

The optical amplification device 50 of the present invention performs, in a normal condition, amplification and attenuation in such a way as to be a set amplification factor and attenuation amount, and outputs optical wavelength multiplexed signals in the C-band and the L-band where a tilt of a spectral shape is relaxed.

The transmitting station T1 and the like transmit, when detecting an increase in the signal loss during passing through an optical fiber, a control signal for changing the attenuation amount together with the information on the set value of the attenuation amount of the optical attenuation unit 53 to the optical amplification device.

The control signal receiving unit 56 in the optical amplification device transmits, when receiving the information on the attenuation amount of the optical attenuation unit 53, the received information to the attenuation control unit 57. The attenuation control unit 57 changes, when receiving the information on the set value of the attenuation amount of the optical attenuation unit 53, a setting of the attenuation amount of the optical attenuation unit 53 in such a way as to be the received set value.

When the setting of the attenuation amount of the optical attenuation unit 53 is changed, the optical attenuation unit 53 attenuates the optical signal with the attenuation amount after the change and outputs the attenuated optical signal. At this time, the optical attenuation unit 53 reduces the attenuation amount and causes the optical power to be output to be larger than the optical power to be output in the normal condition. When the output power on the C-band side increases, transition of the optical power from a short wavelength to a long wavelength occurs by the Raman effect in the optical fiber on the output side. When the transition of the optical power by the Raman effect occurs, level deviation of the optical power between the C-band and the L-band is relaxed, and signal quality of the optical wavelength multiplexed signal to be transmitted to a receiving station T2 is maintained.

The similar effect to the fourth example embodiment can be acquired by using the optical amplification device 50 according to the present example embodiment. The optical amplification device 50 according to the present example embodiment receives the information on the attenuation amount of the optical attenuation unit 53 from the transmitting station T1 and the like via the control signal receiving unit 56, and thus even the optical amplification device 50 installed at a remote place can change the setting of the attenuation amount of the optical attenuation unit 53 and maintain the signal quality of the wavelength multiplexed signal.

Sixth Example Embodiment

Figure 15:
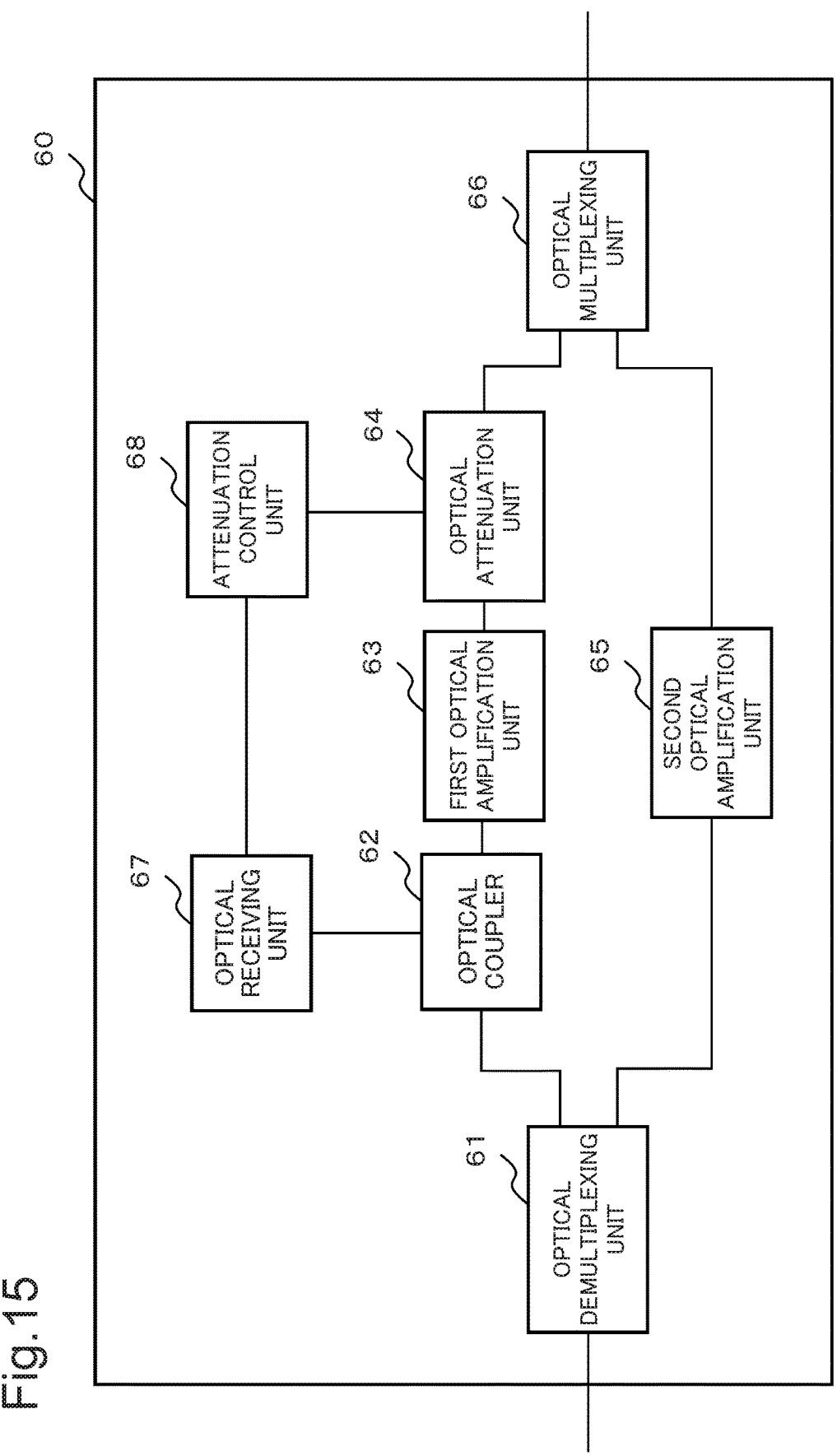
FIG. 15 is a block diagram illustrating a configuration of an optical amplification device according to a sixth example embodiment of the present invention.

A sixth example embodiment of the present invention is described in detail with reference to the drawing. FIG. 15 is a block diagram illustrating a configuration of an optical amplification device 60 according to the present example embodiment. In an optical transmission system similar to the second example embodiment illustrated in FIG. 2, the optical amplification device 60 according to the present example embodiment is used as an optical amplification device.

The optical amplification device 50 according to the fifth example embodiment receives a control signal indicating the attenuation amount of the optical attenuation unit 53 via a communication line or the like for communication management. Instead of such a configuration, the optical amplification device 60 according to the present example embodiment acquires information on an attenuation amount of an optical attenuation unit by detecting a control signal to be transmitted as an optical signal together with a wavelength multiplexed signal.

The optical amplification device 60 according to the present example embodiment includes an optical demultiplexing unit 61, an optical coupler 62, a first optical amplification unit 63, an optical attenuation unit 64, a second optical amplification unit 65, an optical multiplexing unit 66, an optical receiving unit 67, and an attenuation control unit 68.

The configurations and functions of the optical demultiplexing unit 61, the optical coupler 62, the first optical amplification unit 63, the optical attenuation unit 64, the second optical amplification unit 65, and the optical multiplexing unit 66 according to the present example embodiment are similar to the units with the same name according to the fifth example embodiment.

The optical receiving unit 67 detects a control signal from an optical signal to be input, and outputs the detected control signal to the attenuation control unit 68. The control signal is, for example, assigned to a wavelength that is not used for data transmission in the optical wavelength multiplexed signal in the C-band. The control signal may be superimposed on the optical signal of the wavelength band used for communication of a main signal as a low-frequency signal that does not affect the transmission of the main signal.

The attenuation control unit 68 controls the optical attenuation unit 64, based on information on an attenuation amount of the optical attenuation unit 64 included in the control signal to be input from the optical receiving unit 67. The attenuation control unit 68 controls the attenuation amount of optical power in the optical attenuation unit 64, based on the information on the attenuation amount of the optical attenuation unit 64, and changes the optical power to be output from the optical attenuation unit 64.

An operation of the optical amplification device 60 according to the present example embodiment is described. The optical amplification device 60 of the present invention performs, in a normal condition, amplification and attenuation in such a way as to be a set amplification factor and an attenuation amount, and outputs optical wavelength multiplexed signals in the C-band and the L-band where a tilt of a spectral shape is relaxed.

A transmitting station T1 transmits, when detecting an increase in signal loss in an optical fiber, a control signal for changing the attenuation amount together with information on a set value of the optical attenuation unit 64 to the optical amplification device. The attenuation control unit 68 controls, when receiving the control signal via the optical receiving unit 67, the optical attenuation unit 64, based on the set value included in the control signal, and changes the setting to the attenuation amount specified by the control signal.

When the setting of the attenuation amount of the optical attenuation unit 64 is changed in a case of occurring the increase in the signal loss, the optical attenuation unit 64 attenuates the optical signal with the attenuation amount after the change and outputs the attenuated optical signal. At this time, the optical attenuation unit 64 reduces the attenuation amount and causes the optical power to be output to be larger than the optical power to be output in the normal condition. When the output power on the C-band side increases, transition of the optical power from a short wavelength to a long wavelength occurs by the Raman effect in an optical fiber in the subsequent stage. When the transition of the optical power by the Raman effect occurs, level deviation of the optical power between the C-band and the L-band is relaxed, and signal quality of the optical wavelength multiplexed signal to be transmitted to a receiving station T2 is maintained.

The similar effect to the fifth example embodiment can be acquired by using the optical amplification device 60 according to the present example embodiment. The optical amplification device 60 according to the present example embodiment controls the attenuation amount of the optical attenuation unit 64, based on the control signal to be transmitted together with the wavelength multiplexed signal in the C-band, and thus a communication line or the like for communication management is not required. Therefore, even in an environment where it is difficult to install a communication line in addition to an optical fiber for data transmission such as a submarine cable system, when loss of signal light to be input is increasing, wavelength deviation in a wideband optical wavelength multiplexed signal can be suppressed.

In the optical amplification devices according to the second to sixth example embodiments, the first optical amplification units amplify the optical wavelength multiplexed signal in the C-band and the second optical amplification units amplify the optical wavelength multiplexed signal in the L-band, however, as long as the second optical amplification unit side is a long wavelength, the wavelength multiplexed signal may be a wavelength multiplexed signal other than C-band and L-band. In such a configuration, two wavelength bands of the optical wavelength multiplexed signal are set in such a way as to have a wavelength in which signal light in a wavelength band of a long wavelength side is subject to the Raman amplification by signal light in a wavelength band of a low wavelength side.

The optical amplification devices according to the third and sixth example embodiments start amplification or attenuation of a wavelength multiplexed signal related to signal loss during passing through the optical fiber, based on the control signal to be transmitted in the wavelength band of the C-band. Instead of such configurations, the optical amplification device may monitor an input optical wavelength multiplexed signal by receiving at an optical receiving unit, and start, when the optical power or the spectral shape is worse than a reference, amplification or attenuation of the wavelength multiplexed signal related to the signal loss during passing through an optical fiber. The amplification or attenuation of the wavelength multiplexed signal related to the signal loss is started based on a monitoring result in an own device, and thus the signal loss is handled by the optical amplification device in the subsequent stage of the optical fiber where the signal loss is increasing. Therefore, it is not necessary to specify, from a remote place, a location where deterioration or the like occurs. Consequently, a monitoring function of the optical transmission system can be simplified and transmission quality of a signal can be maintained.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-189425, filed on Sep. 29, 2017, the disclosure of which is incorporated herein in its entirety by reference.

REFERENCE SIGNS LIST

1 Optical amplification device
2 Demultiplexing unit
3 First optical amplifier
4 Second optical amplifier
5 Multiplexing unit
6 Raman amplification unit
10 Optical amplification device
11 Optical demultiplexing unit
12 First optical amplification unit
13 Second optical amplification unit
14 Optical multiplexing unit
15 Control signal receiving unit
16 Excitation light control unit
21 Transmitting side terminal device
22 Monitoring device
23 Power supply device
24 Receiving side terminal device
25 Monitoring device
26 Power supply device
30 Optical amplification device
31 Optical demultiplexing unit
32 Optical coupler
33 First optical amplification unit
34 Second optical amplification unit
35 Optical multiplexing unit
36 Optical receiving unit
37 Excitation light control unit
40 Optical amplification device
41 Optical demultiplexing unit
42 First optical amplification unit
43 Optical attenuation unit
44 Second optical amplification unit
45 Optical multiplexing unit
50 Optical amplification device
51 Optical demultiplexing unit
52 First optical amplification unit
53 Optical attenuation unit
54 Second optical amplification unit
55 Optical multiplexing unit
56 Control signal receiving unit
57 Attenuation control unit
60 Optical amplification device
61 Optical demultiplexing unit
62 Optical coupler
63 First optical amplification unit
64 Optical attenuation unit
65 Second optical amplification unit
66 Optical multiplexing unit
67 Optical receiving unit
T1 Transmitting station T2 Receiving station
R1, R2, R3, R4, R5 Optical amplification device
F1, F2, F3, F4, F5, F6 Optical fiber

The invention claimed is:

1. An optical amplification device comprising:
a demultiplexer demultiplexing an optical wavelength multiplexed signal to be input into a first optical wavelength multiplexed signal having a first wavelength band and a second optical wavelength multiplexed signal having a second wavelength band located in a longer wavelength band than the first wavelength band;
a first optical amplifier amplifying the first optical wavelength multiplexed signal;
an excitation light controller controlling excitation light that amplifies the first optical wavelength multiplexed signal in the first optical amplifier;
a second optical amplifier amplifying the second optical wavelength multiplexed signal; and
a multiplexer multiplexing the amplified first optical wavelength multiplexed signal and the amplified second optical wavelength multiplexed signal, and outputting the multiplexed optical wavelength multiplexed signal to a Raman amplifier, wherein
the first optical amplifier adjusts intensity of light of the first optical wavelength multiplexed signal in such a way that intensity of light in the second wavelength band is compensated for by a Raman effect in the Raman amplifier,
the first optical amplifier causes, when loss in an optical fiber through which the optical wavelength multiplexed signal to be input passes increases, an amplification factor of the first optical wavelength multiplexed signal to be larger than a setting in a normal condition, and
the excitation light controller controls the excitation light of the first optical amplifier, based on a control signal received from a monitoring device when loss in the optical fiber through which the optical wavelength multiplexed signal to be input passes increases.

2. An optical transmission system comprising:
a plurality of the optical amplification devices according to claim 1; and
an optical fiber that connects between the optical amplification devices and amplifies a passing optical signal by a Raman effect, wherein
the first optical amplifier of the optical amplification device in which loss increases in the optical fiber in a previous stage adjusts an amplification factor of the first optical wavelength multiplexed signal, and intensity of light in the second wavelength band is compensated for by a Raman effect of the optical fiber in a subsequent stage.

3. The optical amplification device according to claim 1, further comprising:
an optical receiver receiving the control signal as an optical signal of the first wavelength band.

4. The optical amplification device according to claim 1, wherein
the first optical amplifier includes an optical attenuator that attenuates intensity of an optical signal after amplification, and
adjusts intensity of the first optical wavelength multiplexed signal to be output by an attenuation amount by the optical attenuator.

5. The optical amplification device according to claim 4, further comprising:
an optical receiver receiving the control signal to be multiplexed into the first optical wavelength multiplexed signal; and
an attenuation controller controlling an attenuation amount of the optical attenuator, based on the control signal received by the optical receiver.

6. An optical amplification method comprising:
demultiplexing an optical wavelength multiplexed signal to be input into a first optical wavelength multiplexed signal having a first wavelength band and a second optical wavelength multiplexed signal having a second wavelength band located in a longer wavelength band than the first wavelength band;
adjusting an amplification factor of the first optical wavelength multiplexed signal in a first optical amplifier in such a way that intensity of light in the second wavelength band is compensated for by a Raman effect in a Raman amplifier;
amplifying the first optical wavelength multiplexed signal in the first optical amplifier, by using an adjusted amplification factor;
controlling excitation light that amplifies the first optical wavelength multiplexed signal in the first optical amplifier;
amplifying the second optical wavelength multiplexed signal in a second optical amplifier; and
multiplexing the amplified first optical wavelength multiplexed signal and the amplified second optical wavelength multiplexed signal, and outputting the multiplexed optical wavelength multiplexed signal to the Raman amplifier, wherein the method further comprises
causing, when loss in an optical fiber through which the optical wavelength multiplexed signal to be input passes increases, the amplification factor of the first optical wavelength multiplexed signal to be larger than a setting in a normal condition, and
controlling the excitation light of the first optical amplifier, based on a control signal received from a monitoring device when loss in the optical fiber through which the optical wavelength multiplexed signal to be input passes increases.

7. The optical amplification method according to claim 6, further comprising:
adjusting the amplification factor of the first optical wavelength multiplexed signal in the first optical amplifier, based on the control signal to be multiplexed into the first optical wavelength multiplexed signal.

* * * * *